(12) United States Patent
Anderson

(10) Patent No.: US 7,445,109 B2
(45) Date of Patent: Nov. 4, 2008

(54) FEED ROLL CONSTRUCTION

(76) Inventor: Ronald L. Anderson, 410 Chambers St., Eugene, OR (US) 97402

( * ) Notice: Subject to any disclaimer, the term of this patent is extended or adjusted under 35 U.S.C. 154(b) by 0 days.

(21) Appl. No.: 11/807,882

(22) Filed: May 30, 2007

(65) Prior Publication Data
US 2007/0227855 A1 Oct. 4, 2007

Related U.S. Application Data

(62) Division of application No. 11/018,229, filed on Dec. 20, 2004.

(51) Int. Cl.
*B65G 39/09* (2006.01)
(52) U.S. Cl. .......................... 193/37; 198/780
(58) Field of Classification Search ................... 193/37; 198/780, 624
See application file for complete search history.

(56) References Cited

U.S. PATENT DOCUMENTS

| | | | | |
|---|---|---|---|---|
| 2,596,499 A | * | 5/1952 | Mercier | 198/843 |
| 2,631,904 A | * | 3/1953 | Frenkel | 384/450 |
| 3,889,798 A | * | 6/1975 | Jurgens et al. | 198/624 |
| 3,988,045 A | * | 10/1976 | Coutant | 384/587 |
| 4,105,264 A | * | 8/1978 | Zimmermann et al. | 384/419 |
| 4,168,771 A | * | 9/1979 | Krivec | 193/35 A |
| 4,232,914 A | * | 11/1980 | Bowen, III | 384/567 |
| 4,448,296 A | * | 5/1984 | Tabler | 193/35 C |
| 4,655,619 A | * | 4/1987 | f'Geppert | 384/567 |
| 4,762,739 A | * | 8/1988 | Kraus | 428/36.9 |
| 5,135,439 A | * | 8/1992 | Shiratori | 472/116 |
| 5,558,202 A | * | 9/1996 | Miller et al. | 198/624 |
| 5,655,201 A | * | 8/1997 | Islam et al. | 399/322 |
| 5,830,060 A | * | 11/1998 | Kessler, Jr. | 460/54 |
| 6,540,068 B1 | * | 4/2003 | Wesson et al. | 198/843 |
| 6,802,410 B2 | * | 10/2004 | Dyson et al. | 193/37 |

\* cited by examiner

*Primary Examiner*—Douglas A Hess
(74) *Attorney, Agent, or Firm*—James D. Givnan, Jr.

(57) ABSTRACT

A feed roll for use in conjunction with a machine in a food processing operation. A hub of the roll carries a resilient outer component including a sleeve having conical end members which flex during momentary contact with the article. The surface areas of the flexed roll end members are adequate to propel and advance the article being processed while avoiding damage to the article.

2 Claims, 2 Drawing Sheets

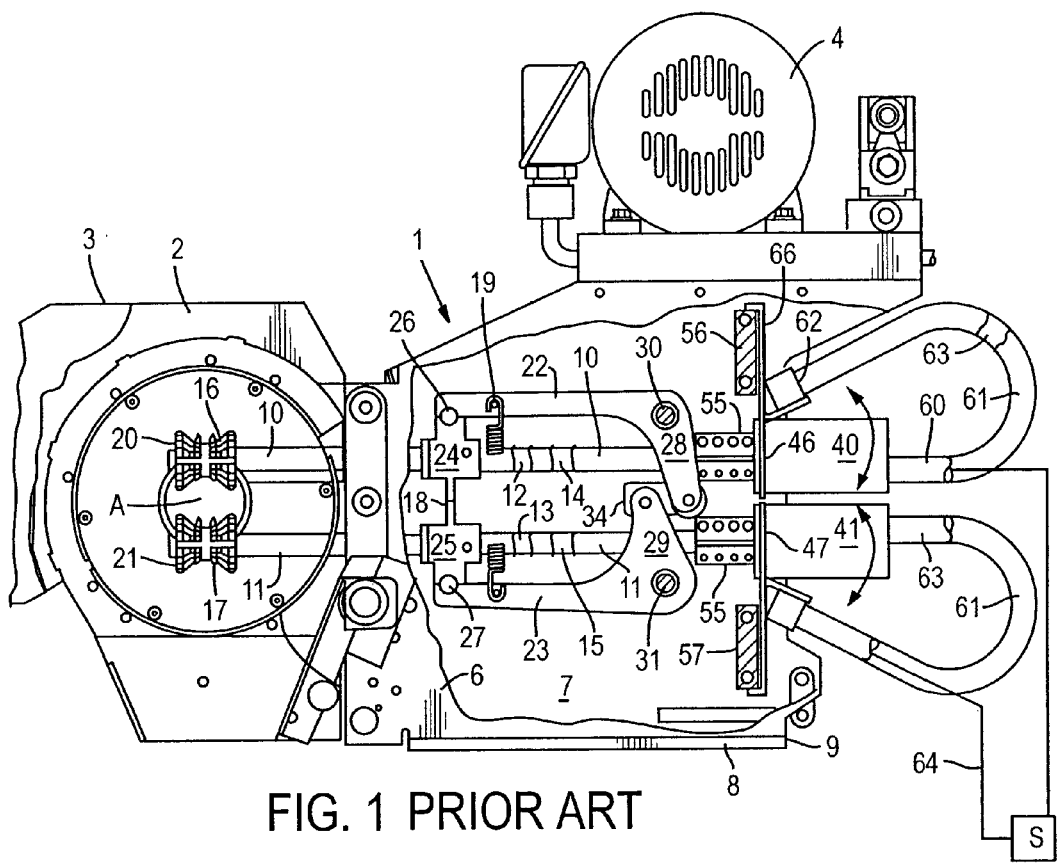
FIG. 1 PRIOR ART
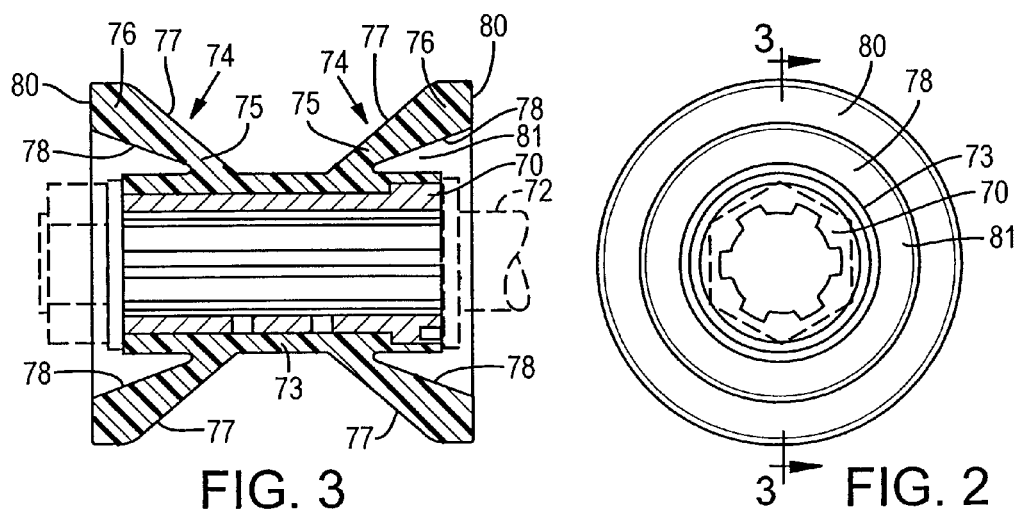
FIG. 3
FIG. 2

FEED ROLL CONSTRUCTION

This is a divisional of U.S. patent application filed Dec. 20, 2004 and accorded Ser. No. 11/018,229.

BACKGROUND OF THE INVENTION

The present invention concerns feed rolls used in commercial enterprises to advance articles along a course during processing of same.

By way of example, in the food processing industry it is a common practice to transfer, in succession, harvested ears of corn along a conveyor path with the objective being the sequential introduction of each ear to a corn cutting machine for separation of kernels from cob.

U.S. Pat. No. 5,830,060, incorporated herein by reference, discloses such a machine. The patented machine has cooperating upper and lower pairs of powered rolls which receive each husk free ear of corn in sequence and advances same into a housing wherein an orbital cutter blade removes the kernels. The upper and lower pairs of rolls have lugs which frictionally engage the ear kernels. The lugs on existing rolls have angular surfaces resulting in line contact with and the rupturing of some kernels which become waste as damaged kernels are often not utilized in the end product. Of interest, is that the ear diameter is directly related to such waste. To the extent known, feed rolls of corn cutting machines have lug bearing surfaces with angular edges and, even though the roll material is somewhat resilient, a substantial number of kernels are rendered unusable. What may initially appear as a minimal loss constitutes a sizeable loss of product when the high volume of processed corn is considered even over a short period of time. The foregoing serves to highlight the problem encountered in a food processing operation but is not intended to imply the present invention is limited to such use.

SUMMARY OF THE PRESENT INVENTION

The present invention is embodied within a feed roll of the type utilized to advance articles along a course in a production operation.

The present roll construction utilizes a molded, resilient body which advances articles in succession along a path with minimal impact and damage to the article including somewhat fragile food products. Inclined roll surfaces yield upon contact with the article. The inclined, product-engaging surfaces, momentarily yield providing adequate frictional engagement with the ear to advance same. Roll walls avoid presenting sharply defined, firm edges to the kernels. Upon ear passage the roll returns to a normal configuration. The use of a resilient synthetic material, such as urethane, enhances adhesion between the feed roll and the article being propelled to the extent, at least in some uses, dispensing with a metal prong heretofore used on a feed roll to assure driving contact with an article of small diameter.

BRIEF DESCRIPTION OF THE DRAWINGS

In the accompanying drawings:

FIG. 1 is a front elevational view of a prior art corn cutting machine having conventional lug equipped rollers or feed rolls;

FIG. 2 is an end elevational view of the present feed rolls;

FIG. 3 is a sectional view taken along line of 3-3 of FIG. 2;

DETAILED DESCRIPTION OF THE PREFERRED EMBODIMENTS

Figure 4:
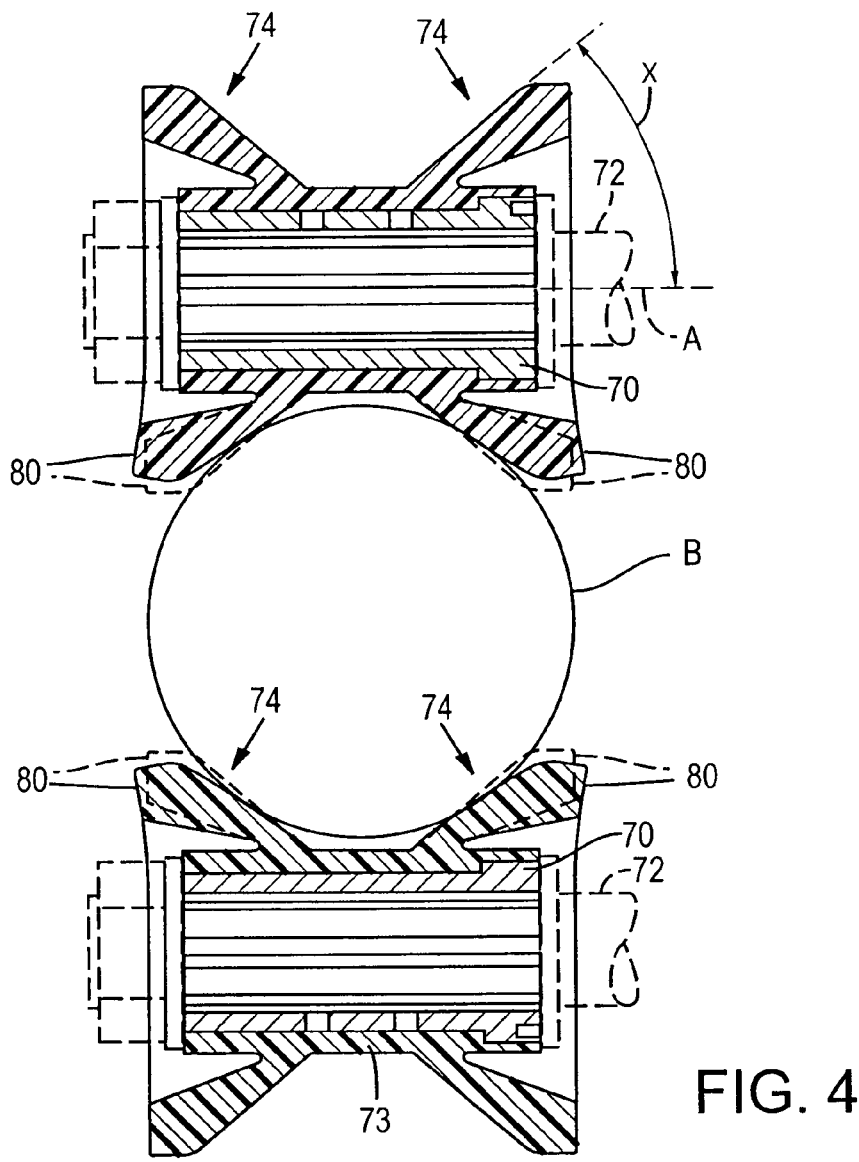
FIG. 4 is an elevational view of one pair of the present feed rolls in contact with an article.

With continuing attention to the drawings wherein applied reference numerals indicate parts similarly hereinafter identified, the reference numeral 1, in U.S. Pat. No. 5,830,060, indicates a corn cutting machine used in food processing plants with a first pair of powered rolls or rollers 16-17 and a second pair of powered rolls at 20-21 all lug equipped. Typically, feed rolls are utilized in multiple pairs such as in the prior art machine shown and disclosed in FIG. 1 in U.S. Pat. No. 5,830,060 incorporated herein by reference. The corn processing machine shown therein has vertically displaceable feed rolls for processing articles of non-constant cross section.

With attention now to the present roll, a hub is 70 is internally grooved or otherwise provided for driven engagement with a shaft 72. A sleeve at 73, of resilient material, is formed about the hub. End members at 74 of a roll are of generally of conical shape each having inner portions 75 merging with outer portions 76 and jointly providing outwardly divergent wall surfaces 77-78 with outer portions 76 terminating in a rim 80. Inner portion 75 of each end member is of reduced cross section for desired flexure upon article contact. An annular open area at 81 permits inward centripetal flexure of the end member during article contact.

A suitable resilient material for a roll is urethane having a rating of 82 on durometer scale A.

The present feed roll is of molded cast construction with a suitable bonding agent utilized between the hub 70 and sleeve 73.

One satisfactory embodiment of the present feed roll, for use in a corn cutter machine, utilizes an inclined roll surface 77 with an included angle X of 40 degrees with the roll axis at A.

In one suitable roll embodiment, a rim diameter is 2.25 inches with an inner rim diameter of 1.73 inches.

If necessary, for roll use with certain types or sizes of products, a pin or pins may be carried at the hub center.

Figure 5:
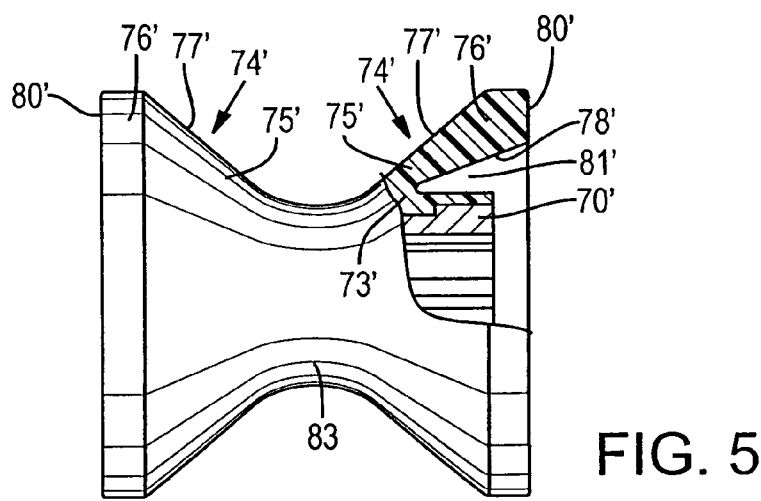
FIG. 5 is a feed roll of modified shape with fragments broken away.

A modified roll is shown in FIG. 5 is the preferred roll. Prime reference numerals indicate parts of the earlier or first described form of the present invention. A center portion 83 of the modified roll is curved inwardly toward the roll axis for additional contact with articles of reduced diameter such as, for example, ears of corn of less than standard diameter.

The feed rolls are commonly retained in place on the driven shaft as at 72 by a threaded fastener in most instances enabling feed roll substitution to best suit the product being processed. If so desired, a metal pin or pins may project outwardly from curved mid-portion 83 to supplement roll to article engagement.

The corn cutter machine shown in prior art FIG. 1 of U.S. Pat. No. 5,830,060 is briefly described as follows to contribute to an understanding of roll use.

A machine having pairs of powered rollers for propelling ears of corn along a course through a cutter head assembly for kernel separation. A hydraulic motor drives each roller by means of a powered shaft which, along with the motor, may be displaced during roller contact with a passing ear of corn by reason of flexible motor mounts each inducing a yieldable distal portion for motor attachment.

The motors are shown in fluid communication with a single source of pressurized fluid. Equalizer arms each associated with a powered shaft ensures uniform, opposite displacement of each pair of rollers during contact with an ear of corn. A link coupling each pair of equalizer arms, and indirectly the shafts associated therewith, effects uniform roller displacement to permit ear travel along an axial course through the machine.

While I have shown but a few embodiments of the invention, it will be apparent to those skilled in the art that the invention may be embodied still otherwise without departing from the spirit and scope of the claimed invention.

I claim:

1. A powered feed roll for moving singular articles in succession along a course through a processing machine, the feed roll including,
   a hub for installation on a motor driven shaft of a machine, and
   a resilient member on said hub and having flexible conical end members axially spaced along and concentric with a hub axis and with unobstructed surfaces and flexed toward the hub axis for momentary surface contact with each article, a sleeve on said hub, said flexible conical end members and said sleeve define annular open areas permitting centripetal flexure of the end members during article contact.

2. A powered feed roll for use in pairs to propel elongate curvilinear articles of different size in sequence along a linear path, each feed roll comprising,
   a hub for reception of a powered shaft,
   a sleeve on said hub,
   conical end members on said sleeve and offset from one another along a rotational axis of the roll,
   a center segment on said sleeve, and
   said conical end members of flexible construction and having portions momentarily deformed toward the hub axis during contact with an article, said conical end members and said sleeve define annular spaces, said portions of the conical end members are received in the annular spaces when deformed by article contact.

* * * * *